J. MAIER.
ADJUSTABLE BORING TOOL.
APPLICATION FILED FEB. 13, 1919.
1,324,459.
Patented Dec. 9, 1919.
2 SHEETS—SHEET 1.
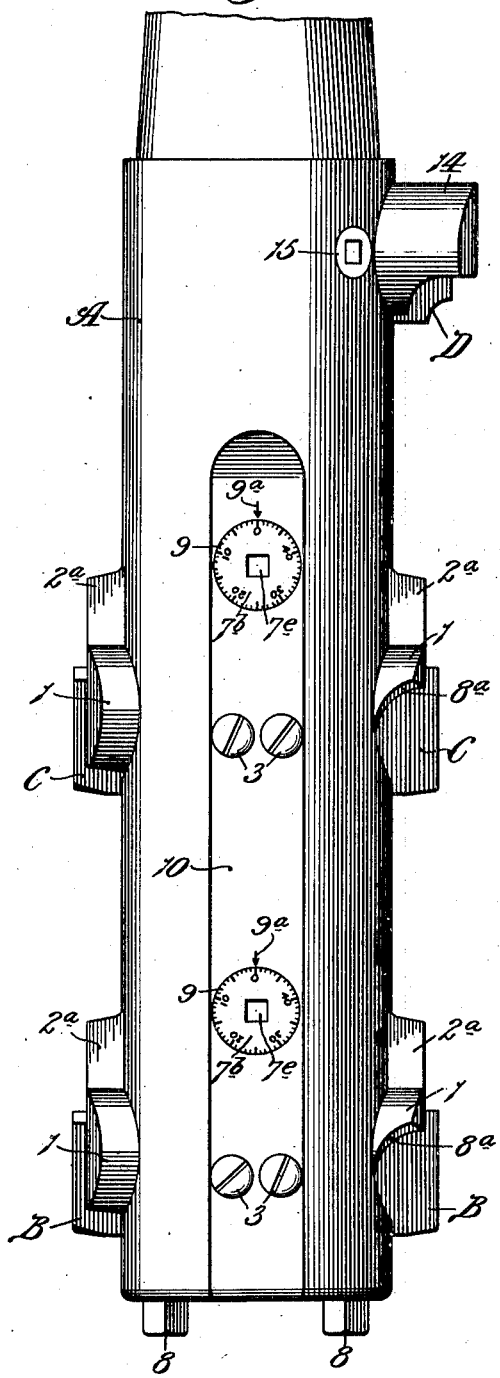
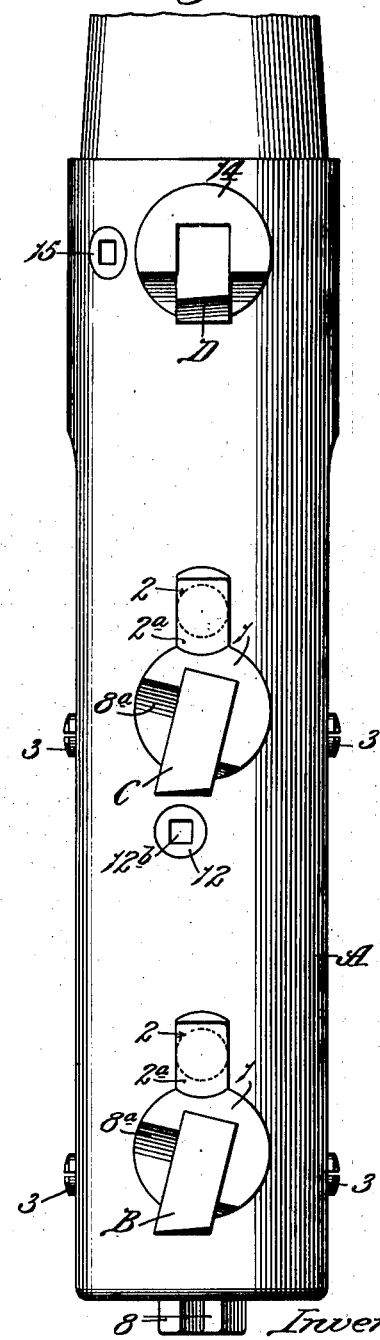
Inventor,
John Maier.
By Bakewell Church attys.

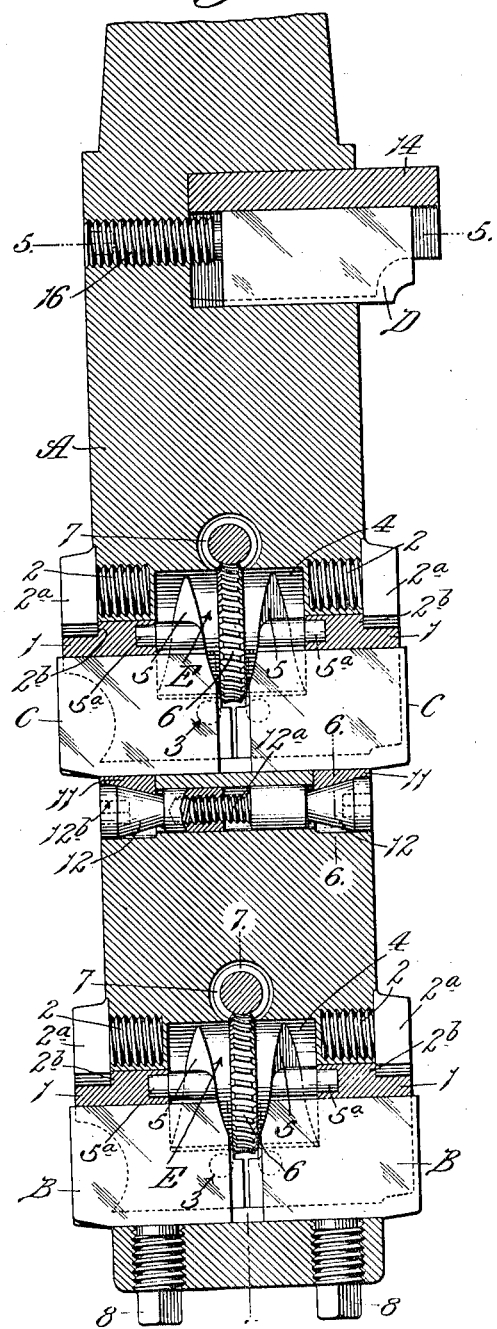

UNITED STATES PATENT OFFICE.

JOHN MAIER, OF ST. LOUIS, MISSOURI.

ADJUSTABLE BORING-TOOL.

1,324,459.   Specification of Letters Patent.   Patented Dec. 9, 1919.

Application filed February 13, 1919. Serial No. 276,815.

*To all whom it may concern:*

Be it known that I, JOHN MAIER, a citizen of the United States, residing at St. Louis, Missouri, have invented a certain new and useful Improvement in Adjustable Boring-Tools, of which the following is a full, clear, and exact description, such as will enable others skilled in the art to which it appertains to make and use the same.

This invention relates to adjustable boring tools such as are used in boring mills, turret lathes, drill presses, etc.

One object of my invention is to provide a strong and serviceable adjustable boring tool whose cutters have a greater range of adjustment than the cutters of adjustable boring tools of the kind now in general use, and also greater chip clearance when they are in their extreme inward position.

Another object is to provide an adjustable boring tool which is so constructed that the stock or shank of the tool will not be cut or damaged by the chips of steel from the work being operated on and the cutters of the tool will not be liable to bend or break off when they are adjusted in their extreme outward position.

Another object is to provide an adjustable boring tool in which the cutter adjusting mechanism is so constructed that the cutters can be adjusted accurately, quickly and easily by simply rotating a part provided with a scale that shows the extent or degree of adjustment of the cutters.

Another object is to provide an adjustable boring tool having cutters set at an angle of 12° and so constructed that the cutting edge portion of each cutter is as strong as the rear edge portion of the cutter.

And still another object is to provide an efficient adjustable boring tool for boring car wheels. Other objects and desirable features of my invention will be hereinafter pointed out.

Figure 1 of the drawings is a side elevation of my improved boring tool.

Fig. 2 is a side elevation of the tool, taken at right angles to Fig. 1.

Fig. 3 is a vertical sectional view of the tool.

Fig. 4 is a bottom plan view of the tool; and

Figs. 5, 6 and 7 are sectional views, taken on the lines 5—5, 6—6 and 7—7 of Fig. 3.

Referring to the drawings which illustrate a tool constructed in accordance with my invention, designed for use in boring car wheels, A designates the stock or shank of the tool. B designates a pair of cutters arranged adjacent the lower end of the stock for roughing out the hole being bored. C designates a pair of cutters arranged approximately midway the length of the stock for finishing the hole, and D designates a cutter arranged adjacent the upper end of the stock for rounding off the edge or corner of the hole. While I have herein illustrated my invention embodied in a boring tool provided with a plurality of sets of cutters, I wish it to be understood that my invention is not limited to a tool designed for use in boring car wheels or to a tool provided with a plurality of sets of cutters, as my broad idea consists in a boring tool comprising a stock or shank, a pair of laterally-adjustable cutters mounted in cutter holders on said shank and a rotatable member arranged in the stock for moving the cutters outwardly.

The cutters B are adjustably mounted in cutter holders 1 that project laterally from the stock A and which are arranged diametrically opposite each other, each of said cutter holders consisting of a cylindrical block of metal that is harder or has greater wear resisting properties than the metal in the stock A of the tool. The cutters B each consist of a substantially oblong-shaped block of metal, of approximately uniform cross-section throughout its entire length, arranged horizontally with its outer end projecting beyond the outer end of its cutter holder 1. The cutter holders 1 are arranged in a horizontally-disposed hole that extends transversely through the stock A, and the cutters B are arranged in slots formed in the cutter holders. In the form of my invention herein shown the lower edge portions of the cutters B project downwardly slightly below the cutter holders 1 and enter a groove that extends transversely of the stock A at the lower side of the cylindrical hole in the stock that receives the cutter holders 1, the slots in the cutter holders and the coöperating groove in the stock being so disposed that the cutters B will stand at an angle of approximately 12° to the vertical axis of the stock, as shown in Fig. 2, as this is the angle which has been found to be most efficient for the cutters of adjustable boring tools. The cutter holders 1 are locked securely in the stock of the tool by means of screws 2 arranged above the cutter holders, as shown in Fig. 3, and tapped into the stock and screws 3 arranged at right angles to the screws 2 and tapped into the cutter holders 1, as shown in Figs. 4 and 7. The screws 2 are provided with heads 2$^a$ that bear against shoulders 2$^b$ on the cutter holders and the cutter holders are notched out at their upper sides, as shown in Fig. 2, so as to receive the heads of said screws and thus enable the screws 2 to be screwed into and out of the stock to secure or release the cutter holders.

The means for adjusting the cutters B consists of a rotatable device E arranged in a recess or chamber 4 in the stock A between said cutters, as shown in Fig. 3, and provided with two spiral surfaces or cam surfaces 5, against which the inner ends of the cutters B bear. The device E has horizontally-disposed trunnions 5$^a$ which are journaled in bearings in the inner ends of the cutter holders 1 and means is provided for rotating the device E so as to cause the cam surfaces 5 on same to move the cutters outwardly. The means just referred to preferably consists of a worm gear 6 on the member E that coöperates with a worm 7 arranged above said gear and extends transversely through the stock A of the tool, as shown in Fig. 7. The worm 7 is provided at one end with an enlarged bearing portion 7$^a$ that fits snugly in the cylindrical hole in the stock through which the worm passes, and also a head 7$^b$ whose outer end extends flush with the outer side of the stock. The opposite end of the worm 7 bears against a counter-sunk washer 7$^c$ that is set in a recess in the outer face of the stock and rigidly connected to the worm by a screw 7$^d$. The head 7$^b$ on the adjusting worm is provided with a non-circular-shaped hole 7$^e$ in which a device can be inserted so as to turn the worm. Any suitable means can be used for locking the cutters B in adjusted position, such, for example, as vertically-disposed screws 8 in the lower end of the stock whose inner ends bear against the bottom edges of the cutters, and thus clamp the cutters securely in the cutter holders. The portions of the cutter holders 1 that project laterally from the stock on the front sides of the cutters are notched or cut away at 8$^a$, as shown in Fig. 1, so as to provide a clearance for the chips that the cutters remove from the work being operated on.

By providing the tool with holders 1 for the cutters B instead of mounting the cutters directly in the stock of the tool, as has heretofore been the general practice, I am able to reduce the diameter of the stock of the tool to such an extent that ample chip clearance is provided, even when the cutters are arranged in their extreme inward position. Consequently, I prevent the stock of the tool from becoming cut and damaged by the chips of steel that the cutters remove from the work. As the cutters are mounted in holders formed of metal which has greater wear resisting properties than the metal in the stock of the tool, the side walls of the openings in which the cutters are mounted will not wear away quickly, as usually occurs when the cutters are mounted directly in the stock of the tool. Consequently, the cutters are not apt to bend or break, as they are securely supported or backed up at all times by hardened surfaces of relatively great area that will not wear away and permit the cutters to deflect backwardly during the cutting operation.

Another desirable feature of my improved tool is that the cutters B have a greater range of adjustment than the cutters of adjustable boring tools of the kind now in general use, and are backed up by a means that effectively takes up the end thrust on the cutters. This is made possible by equipping the tool with a cutter adjusting mechanism consisting of a rotatable member E arranged between the cutters and provided with cam surfaces of spiral form that bear against the inner ends of the cutters. The cutters can be adjusted quickly and easily simply by turning the worm 7, and in order to assist the operator to set the cutters accurately, the head 7$^b$ of the adjusting worm is provided with a scale or graduation marks 9, as shown in Fig. 1, that coöperate with a stationary mark 9$^a$ on the outer face of the stock of the tool, the stock being provided with a flat surface 10 in which the head 7$^b$ is rotatably mounted. It has heretofore been the usual practice in boring tools to arrange the cutters in the stock of the tool in a vertical position and then bevel off the cutters in such a manner that cutting edges of same would be disposed at an angle of approximately 12°. This naturally made the cutting edge portions of the cutters considerably weaker than the back edge portions of the cutter. In my improved tool the cutters are set at the desirable angle of approximately 12°, but the cutters, instead of being beveled off on one side, are of substantially uniform cross section throughout their entire length and are set at an angle to the vertical axis of the stock, instead of in a vertical position. Accordingly, the cutters of my tool are exceptionally strong and rigid.

The cutters C, which are used to finish the hole that has been roughed out by the cutters B, are of substantially the same construction as said cutters B, and a similar means, indicated by corresponding reference characters, is provided for supporting them and adjusting them laterally. The means that I prefer to use for locking the cutters C in adjusted position, however, consists of clamping blocks 11 arranged in openings in the sides of the stock A beneath said cutters and tapered or wedge-shaped devices 12 of substantially cone shape arranged underneath said clamping blocks and adapted to be moved inwardly so as to force said clamping blocks upwardly, and thus cause them to bind the cutters C securely in their holders. The devices 12 are journaled in the stock of the tool and said devices are connected together by a screw-threaded shank 12$^a$ on one device that projects into a screw-threaded opening in the other device 12, thereby causing said devices to move simultaneously. The outer ends of the devices 12 extend flush with the outer surface of the stock A and one or both of said devices are provided at their outer end with a non-circular-shaped recess 12$^b$ into which an instrument can be inserted to turn said devices.

The cutter D, which rounds off the edge of the finished hole, is mounted in a cutter holder 14 that is clamped in the stock A of the tool by a screw 15 which is tapped into the stock and also into said cutter holder, as shown in Fig. 5, the end of said screw being tapered and said screw being set at such an angle that when it is tightened the end of same will bear against the cutter D and thus securely clamp said cutter in the cutter holder 14. The cutter D can be adjusted laterally by turning a horizontally-disposed screw 16 in the stock A that bears against the inner end of said cutter, as shown in Fig. 3.

Having thus described my invention, what I claim and desire to secure by Letters Patent, is:

1. A boring tool, comprising a stock or shank, a pair of stationary cutter holders arranged in said stock and projecting laterally from the sides of same, laterally-adjustable cutters mounted in said cutter holders, and means for moving said cutters simultaneously relatively to said cutter holders to adjust the cutters.

2. A boring tool, comprising a stock or shank provided with a transversely-disposed opening that extends through same, a pair of stationary cutter holders arranged in said opening diametrically opposite each other and projecting laterally from the sides of the stock, means for immovably securing said cutter holders in operative position in the stock, and laterally-adjustable cutters mounted in said cutter holders and adapted to be moved relatively to same to change the adjustment of the cutters.

3. A boring tool, comprising a stock or shank, a pair of stationary cutter holders arranged diametrically opposite each other in said stock and projecting laterally from the sides of same, laterally-adjustable cutters slidingly mounted in slots in said cutter holders, a rotatable member arranged transversely of said stock between said cutters and provided at its ends with cam surfaces that bear against the inner ends of said cutters and move said cutters outwardly when said member is turned in one direction, and means for actuating said rotatable member.

4. A boring tool, comprising a stock or shank, stationary cutter holders mounted in said stock, laterally-adjustable cutters slidingly mounted in said cutter holders, a rotatable member arranged in a recess in said stock between the inner ends of said cutters and journaled in said cutter holders, and inclined surfaces or cam surfaces on said member that bear against the cutters and move them outwardly when said member is turned in one direction.

5. A boring tool, comprising a stock or shank provided with a transversely disposed opening that extends through same, cylindrical cutter holders arranged in said opening and projecting laterally from the sides of the stock, means for locking said cutter holders in position, laterally-adjustable cutters slidingly mounted in slots in said cutter holders and a coöperating groove in said stock, a rotatable member arranged in a recess in said stock and provided with trunnions that are journaled in said cutter holders, spiral surfaces on said member that bear against said cutters and move them outwardly when said member is rotated in one direction, a worm gear on said rotatable member, and a worm journaled in said stock in mesh with said gear for actuating said rotatable member.

JOHN MAIER.